United States Patent
Otanez et al.

(10) Patent No.: US 8,795,119 B2
(45) Date of Patent: Aug. 5, 2014

(54) LATCHING CLUTCH VALVE CONTROL SYSTEM

(71) Applicant: GM Global Technology Operations LLC, Detroit, MI (US)

(72) Inventors: Paul G. Otanez, Troy, MI (US); Craig S. Ross, Ypsilanti, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 13/890,869

(22) Filed: May 9, 2013

(65) Prior Publication Data
US 2013/0319813 A1 Dec. 5, 2013

Related U.S. Application Data

(60) Provisional application No. 61/653,811, filed on May 31, 2012.

(51) Int. Cl.
*F16H 31/00* (2006.01)

(52) U.S. Cl.
USPC ........... 475/127; 475/116; 475/142; 475/146; 251/32

(58) Field of Classification Search
USPC ...................... 475/116, 127, 142, 146; 251/32
See application file for complete search history.

(56) References Cited

U.S. PATENT DOCUMENTS

| | | | | | |
|---|---|---|---|---|---|
| 2,966,918 | A | * | 1/1961 | Kosmalski | 251/116 |
| 4,446,759 | A | * | 5/1984 | McCrary | 475/146 |
| 8,561,640 | B2 | * | 10/2013 | McConnell et al. | 251/230 |
| 2011/0139285 | A1 | | 6/2011 | Lundberg et al. | |
| 2012/0144945 | A1 | * | 6/2012 | Bai et al. | 74/473.11 |
| 2012/0152688 | A1 | * | 6/2012 | Lee et al. | 192/85.63 |
| 2013/0042927 | A1 | * | 2/2013 | Neelakantan et al. | 137/334 |
| 2013/0139906 | A1 | * | 6/2013 | Neelakantan et al. | 137/334 |
| 2013/0233396 | A1 | * | 9/2013 | Lee et al. | 251/62 |
| 2013/0281253 | A1 | * | 10/2013 | Ross et al. | 475/275 |

OTHER PUBLICATIONS

Pending U.S. Appl. No. 13/857,429, filed Apr. 5, 2013, by Ross et al. All pages.
Pending U.S. Appl. No. 13/867,495, filed Apr. 22, 2013, by Ross et al. All pages.
Pending U.S. Appl. No. 13/918,117, filed Jun. 14, 2013, by Otanez et al. All pages.

* cited by examiner

*Primary Examiner* — Derek D Knight

(57) ABSTRACT

A valve assembly includes a valve body having an input in selective communication with an output, a latching piston disposed within the valve body, a balance spring disposed between the latching piston and the valve body, and a valve piston disposed within the valve body. The input communicates with the output when the valve piston is in a first position and the input does not communicate with the output when the valve piston is in a second position. A diaphragm spring is disposed between the latching piston and the valve piston. A holding spring is disposed between the valve piston and the valve body.

20 Claims, 8 Drawing Sheets

LATCHING CLUTCH VALVE CONTROL SYSTEM

CROSS-REFERENCE TO RELATED APPLICATIONS

This application claims the benefit of U.S. Provisional Application No. 61/653,811 filed May 31, 2012. The disclosure of the above application is incorporated herein by reference.

FIELD

The present invention relates to a latching clutch valve control system for use in an automatic transmission having torque-transmitting devices that are selectively engageable to achieve multiple gear ratios. More particularly, the present invention relates to a latching clutch valve having multiple unlatching states.

BACKGROUND

The statements in this section merely provide background information related to the present disclosure and may or may not constitute prior art.

A typical multiple speed transmission uses a combination of a plurality of torque transmitting mechanisms, planetary gear arrangements and fixed interconnections to achieve a plurality of gear ratios. The number and physical arrangement of the planetary gear sets, generally, are dictated by packaging, cost and desired speed ratios.

In order to increase the fuel economy of motor vehicles, it may be desirable to stop the engine during certain circumstances, such as when stopped at a red light or idling. The engine is then turned back on when certain conditions are met, such as a throttle being depressed. This automatic engine stop and restart is referred to as engine stop/start. During an engine stop, the hydraulic control system which controls the transmission may lose pressure. After the engine has been shut down and has remained off for an extended period of time, the hydraulic fluid within the transmission the fluid may drain down from the passages of the hydraulic control system into a transmission sump under the force of gravity. Upon engine restart, the transmission may take an appreciable amount of time to establish pressure before full transmission operation may resume.

In some powertrain systems it is generally desirable to have quick shift timing and system recovery. As such, it may be desirable to maintain pressure in a clutch, even when line pressure within the hydraulic control system and/or clutch feed pressure is zero or near zero. In other situations, however, it may be desirable to eliminate clutch feed pressure to a particular clutch, such as when putting a vehicle in reverse. Accordingly, there is a need for a clutch pressure control system that allows for timely shifting and recovery, even if the engine or motor is shut off, but that also allows a vehicle to move in reverse or to otherwise deactivate a clutch or multiple clutches.

SUMMARY

The present disclosure provides a latching system to retain clutch pressure for one or more torque transmitting mechanisms in an automatic transmission, and to release clutch pressure when desired.

In one example, a valve assembly is provided in a transmission. The valve assembly includes a valve body having an input in selective communication with an output, a latching piston disposed within the valve body, a balance spring disposed between the latching piston and the valve body, and a valve piston disposed within the valve body. The input communicates with the output when the valve piston is in a first position and the input does not communicate with the output when the valve piston is in a second position. A diaphragm spring is disposed between the latching piston and the valve piston. A holding spring is disposed between the valve piston and the valve body.

In one embodiment of the valve assembly, the latch piston includes a first side in communication with the input and a second side in selective communication with the input.

In another embodiment of the valve assembly, a pressure relief valve is disposed within the valve body. The pressure relief valve allows selective communication between the input and the second side of the latching piston.

In another embodiment of the valve assembly, an inner housing is disposed within the valve body and the latching piston is disposed within the inner housing.

In another embodiment of the valve assembly, the inner housing includes a first port in communication with the first side of the latching piston, a second port in communication with the pressure relief valve, and a third port in communication with a sump.

In another embodiment of the valve assembly, the valve piston is sealingly engaged to the valve body and the valve piston includes a stem that is disposed through an opening in the inner housing.

In another embodiment of the valve assembly, the diaphragm spring contacts the second side of the latching piston and the stem of the valve piston.

In another embodiment of the valve assembly, the balance spring contacts the second side of the latching piston and the inner housing.

In another embodiment of the valve assembly, the valve body defines a fluid passage that communicates from the input to the output.

In another embodiment of the valve assembly, the valve piston covers the output when the valve piston is in the second position.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1:
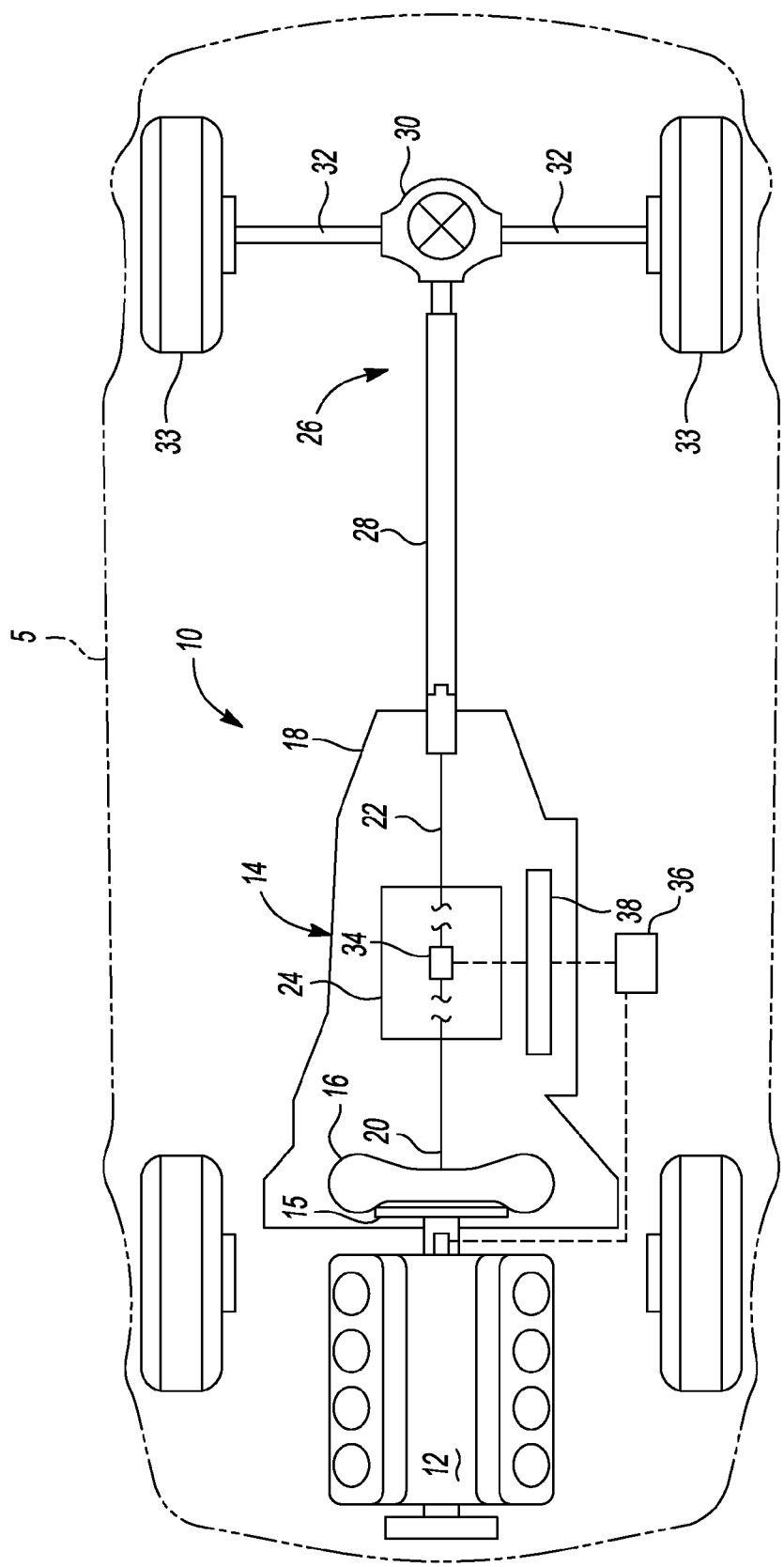
FIG. 1 is a schematic diagram of an exemplary powertrain in a motor vehicle according to the principles of the present invention.

With reference to FIG. 1, a motor vehicle is shown and generally indicated by reference number 5. The motor vehicle 5 is illustrated as a passenger car, but it should be appreciated that the motor vehicle 5 may be any type of vehicle, such as a truck, van, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric motor, or any other type of prime mover, without departing from the scope of the present disclosure. The engine 12 supplies a driving torque to the transmission 14 through a flexplate 15 or other connecting device that is connected to a starting device 16. The starting device 16 may be a hydrodynamic device, such as a fluid coupling or torque converter, a wet or dry clutch, or an electric motor. It should be appreciated that any starting device between the engine 12 and the transmission 14 may be employed or that the starting device 16 may be removed.

The transmission 14 generally includes a typically cast, metal housing 18 which encloses and protects the various components of the transmission 14. The housing 18 includes a variety of apertures, passageways, shoulders and flanges which position and support these components. A transmission input shaft 20 and a transmission output shaft 22 are supported by the transmission housing 18. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The motor vehicle 5 includes a control system 36. The control system 36 may include a transmission control module, an engine control module, or a hybrid control module, or any other type of controller. The control system 36 may include one or more electronic control devices having a pre-programmed digital computer or processor, control logic, memory used to store data, and at least one I/O peripheral. The control logic includes a plurality of logic routines for monitoring, manipulating, and generating data. The control module 36 controls the actuation of the clutches/brakes 34 via a hydraulic control system 38. The hydraulic control system 38 is operable to selectively engage the clutches/brakes 34 by selectively communicating a hydraulic fluid to the clutches/brakes 34 that engages the clutches/brakes 34.

Figure 2:
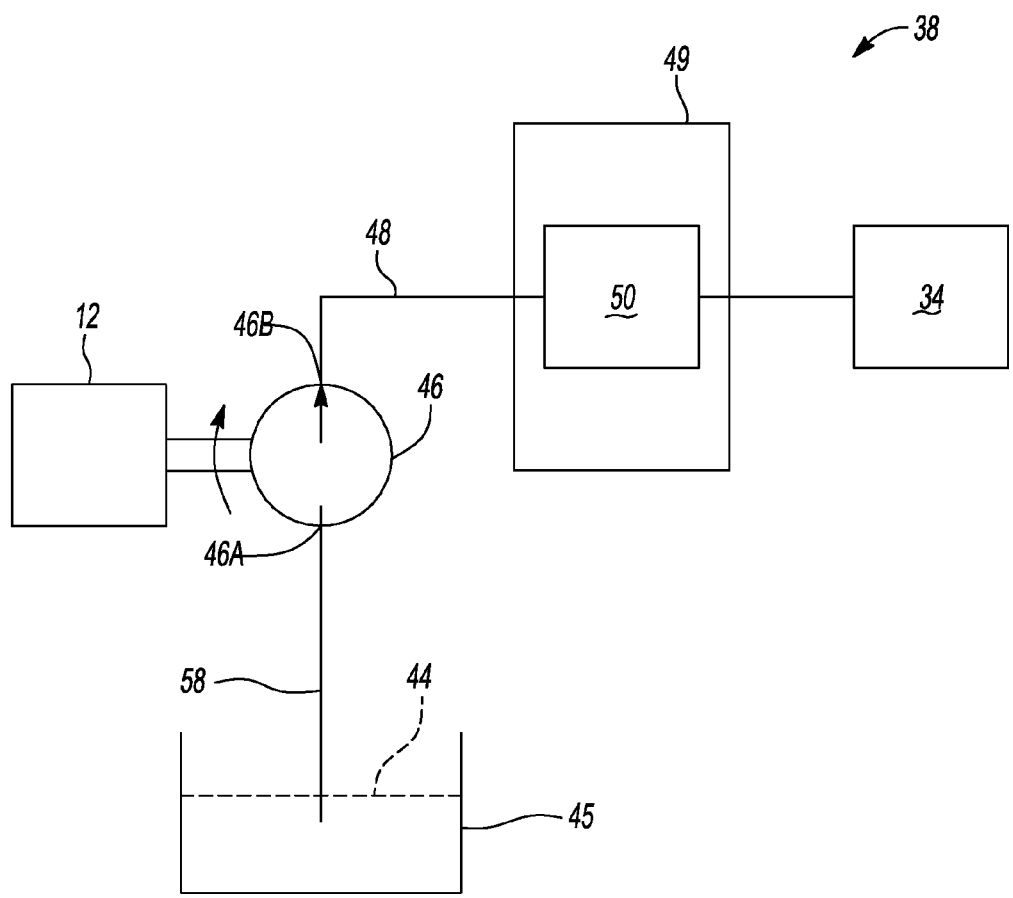
FIG. 2 is a schematic diagram of a portion of an exemplary hydraulic control system in accordance with the principles of the present invention.

Turning to FIG. 2, a portion of the hydraulic control system 38 is illustrated. At the outset it should be appreciated that the portion of the hydraulic control system 38 shown in FIG. 2 is exemplary and that other configurations may be employed. Generally speaking, the hydraulic control system 38 is operable to provide lubrication and cooling to various components of the transmission 14 and to selectively engage the clutches/brakes 34 by communicating a hydraulic fluid 44, such as automatic transmission fluid, from a sump 45 to various circuits or subsystems of the transmission 14. The sump 45 is a tank or reservoir to which the hydraulic fluid 44 returns and collects from various components and regions of the automatic transmission 14. The hydraulic fluid 44 is forced from the sump 45 and communicated throughout the hydraulic control system 38 via a pump 46. The pump 46 may be, for example, a gear pump, a vane pump, a gerotor pump, or any other positive displacement pump. The pump 46 may be driven by the engine 12 or by an electric motor or other prime mover without departing from the scope of the present invention. The pump 46 includes an inlet port 46A and an outlet port 46B. The inlet port 46A communicates with the sump 45 via a suction line 47. The outlet port 46B communicates pressurized hydraulic fluid 44 to a main line pressure circuit 48. The main line pressure circuit 48 may include various optional features including, for example, a spring biased blow-off safety valve, a pressure side filter, or a spring biased check valve.

The main line pressure circuit 48 communicates with a clutch actuation circuit 49 and the various other subsystems and circuits (not shown) of the hydraulic control system 38. For example, the hydraulic control system 38 may include cooling circuits, lubrication circuits, starting device control circuits, to name but a few. The clutch actuation circuit 49 includes clutch control solenoids, valves, and actuators operable to engage the plurality of clutches/brakes 34. The clutch actuation circuit 49 further includes a latching clutch control valve or system 50 according to the principles of the present invention.

Figure 3:
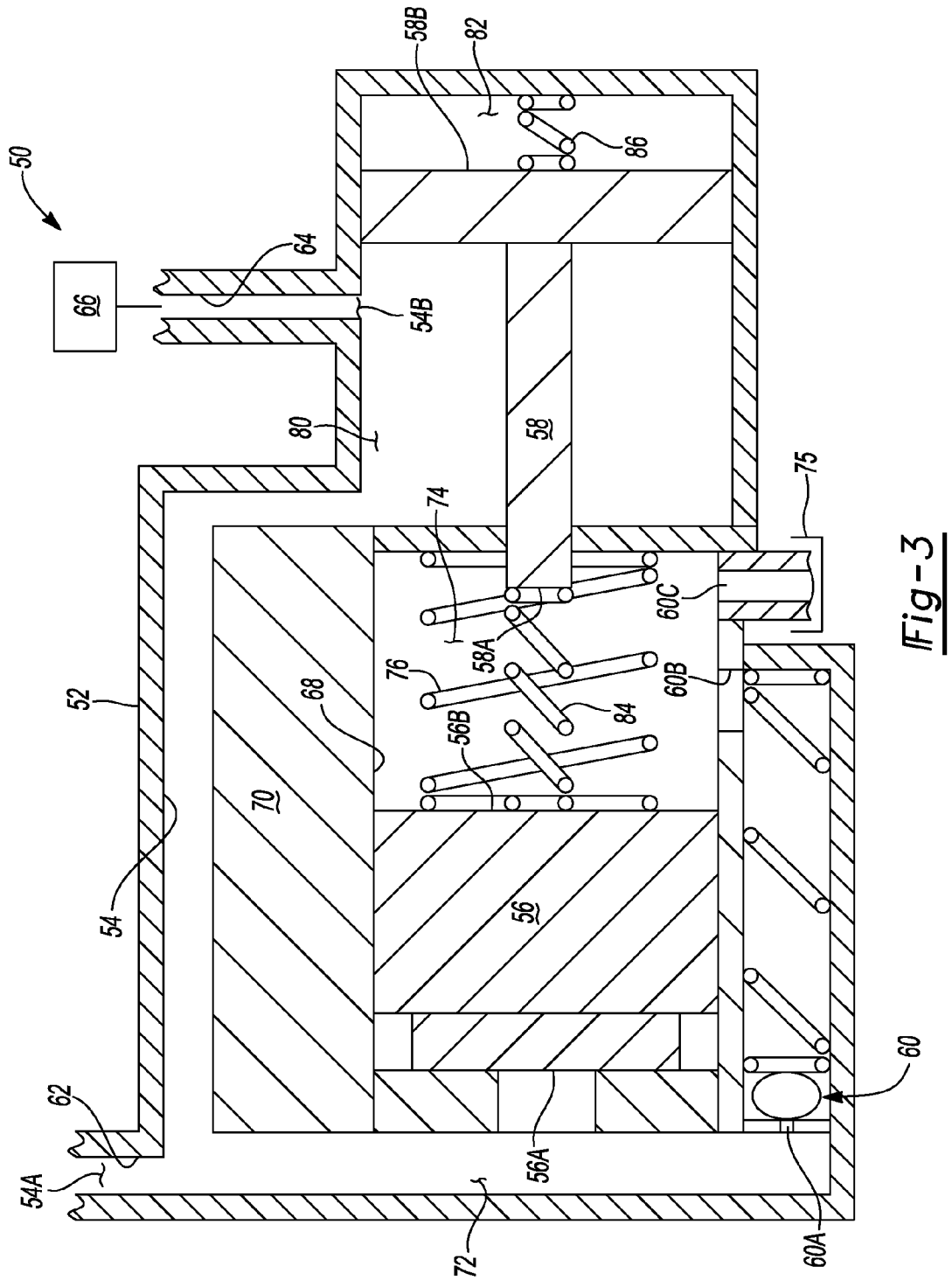
FIG. 3 is a schematic diagram of an exemplary latching clutch valve in a first state according to the principles of the present invention.

With reference to FIG. 3, the latching clutch control valve 50 used as a part of the clutch actuation circuit 48 is illustrated as a schematic diagram. The latching clutch control valve 50 includes a valve body 52. The valve body 52 includes an axial passage 54 that houses a latching piston 56, a valve piston 58, and a blow off valve 60. The valve body 52 further includes a first port 54A that communicates with the passage 54 and a second port 54B that communicates with the passage 54. The first port 54A is in communication with a feed line 62. The feed line 62 is in fluid communication with the main supply line 48 or any other fluid feed line. The second port 54B is in communication with a clutch supply line 64. The clutch supply line 64 is in communication with an actuator 66 of one of the plurality of torque transmitting mechanisms 34.

The latching piston 56 is slidably disposed within the passage 54 and includes a first end surface 56A and a second end surface 56B opposite the first end surface 56A. In the example provided the latching piston 56 is disposed within an inner bore 68 defined by an inner cylindrical housing 70 that is substantially coaxial with the passage 54. The first end surface 56A of the latching piston 56 cooperates with the passage 54 and the inner housing 70 to define a first fluid chamber 72. The second end surface 56B of the latching piston 56 cooperates with the inner housing 70 to define a second fluid chamber 74. At least one biasing member or balance spring 76 is disposed between the second end 56B of the latching piston 56 and the inner housing 70. The balance spring 76 biases the latching piston 56 axially towards the first fluid chamber 72.

The valve piston 58 is slidably disposed within the passage 54 and includes a first end surface 58A and a second end surface 58B. In the example provided a portion of the valve piston 58 extends through the inner housing 70 such that the first end surface 58A is disposed within the second fluid chamber 74. The valve piston 58 divides the passage 54 into a third fluid chamber 80 and a fourth fluid chamber 82. A biasing member or latching spring 84 is connected between the second end 56B of the latching piston 56 and the first end 58A of the valve piston 58. In the example provided the latching spring 84 is preferably a diaphragm spring, though it should be appreciated that other types of biasing members may be employed without departing from the scope of the present invention so long as the latching spring 84 has an inverted condition that does not exert force. A biasing member or holding spring 86 is connected between the second end 58B of the valve piston 58 and the passage 54 of the valve body 52.

The first and third fluid chambers 72 and 80 are in fluid communication with each other and with the first port 54A. The second fluid chamber 74 is selectively hydraulically isolated or sealed by the check valve 60 from the first and third fluid chambers 72 and 80. The fourth fluid chamber 82 is hydraulically isolated or sealed from the fluid chambers 72, 74, and 80.

The check valve or one-way valve 60 is disposed between the first fluid chamber 72 and the second fluid chamber 74. The one-way valve 60 includes a port 60A and a port 60B. The port 60A is in fluid communication with the first fluid chamber 72 and the port 60B is in fluid communication with the second fluid chamber 74. The one-way valve 60 allows for fluid communication in one direction only. In the example provided, the one-way valve 60 allows for fluid communication from port 60A to port 60B and prevents fluid communication from port 60B to port 60A. Under certain fluid pressure conditions, as will be described below, the one-way valve 60 unseats to allow fluid communication between the first fluid chamber 72 and the second fluid chamber 74. An exhaust port 60C is located within the second fluid chamber 74. The exhaust port 60C includes a restricted flow orifice that allows the second fluid chamber 74 to leak or exhaust to a sump 75.

During normal operating conditions, the main supply line 48, or any other fluid feed line, provides hydraulic fluid to the first port 54A of latching valve 50. The hydraulic fluid provided during normal operating conditions is pressurized at a level below a first threshold. An example of a first threshold value for use with the present invention is approximately 21 bar. In this condition, the balance spring 76 is sufficient to bias the latching piston 56 to seat within the inner bore 68 (i.e. the latching piston 56 is disposed to the left with respect to FIG. 3). The latching spring 84 therefore is in compression and holds the valve piston 58 against the bias of the holding spring 86 (i.e. holds the valve piston 58 to the right with respect to FIG. 3). With the valve piston 58 held to the right or stroked, the first port 54A communicates with the second port 54B and hydraulic fluid at normal operating pressure conditions freely flows through the latching valve 50 to the clutch actuator 66.

Figure 4:
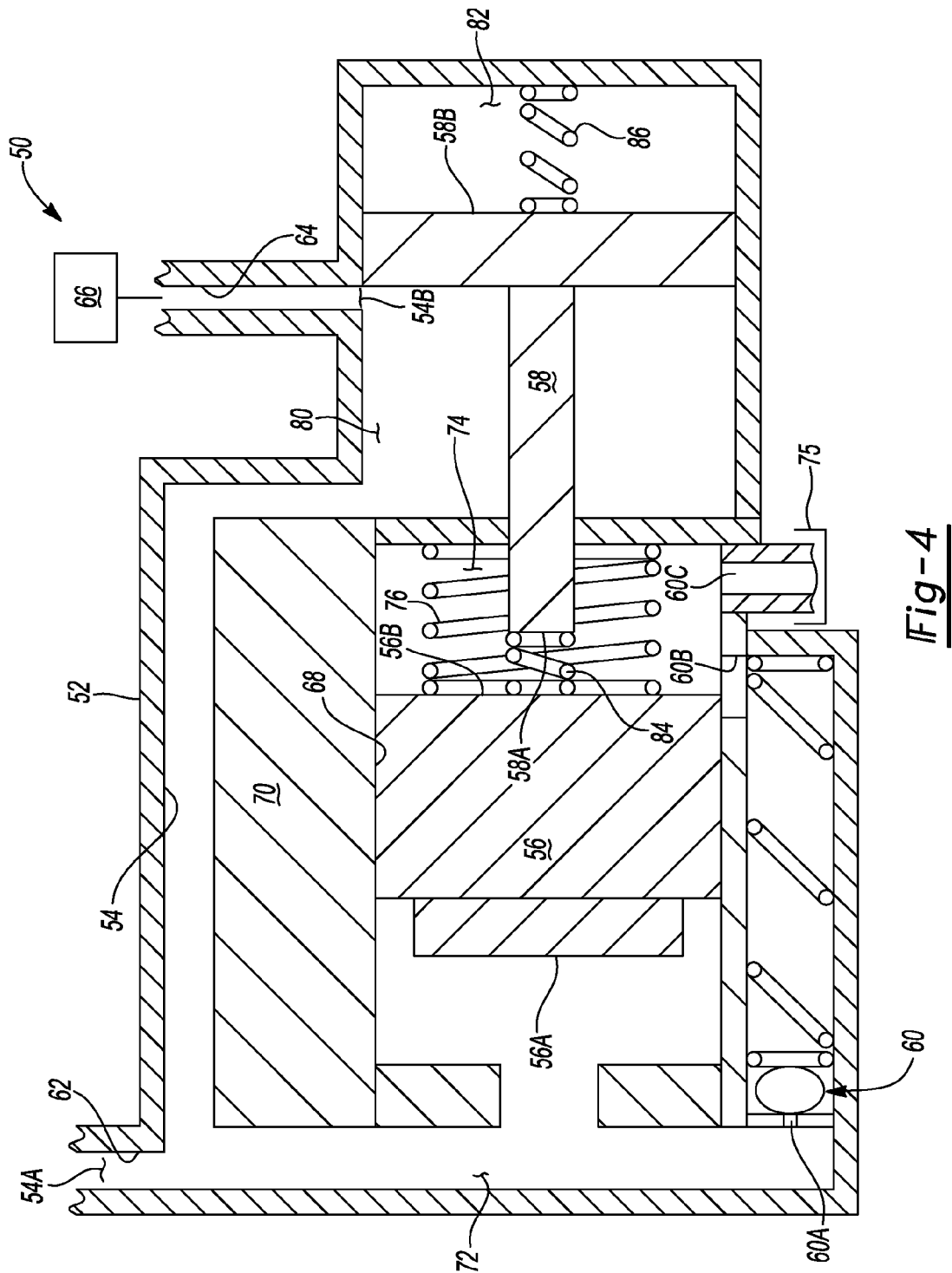
FIG. 4 is a schematic diagram of an exemplary latching clutch valve in a second state according to the principles of the present invention.

Turning to FIG. 4, during an over-pressurization condition the main supply line 48 provides hydraulic fluid to the first port 54A of latching valve 50 at a pressure level greater than the threshold. In this condition, the balance spring 76 is no longer sufficient to bias the latching piston 56 to seat within the inner bore 68 and the latching piston 56 strokes to unseat from the inner bore 68 (i.e. moves to the right). The latching spring 84 is deflected and inverts, no longer holding the valve piston 58 in the stroked position.

Figure 5:
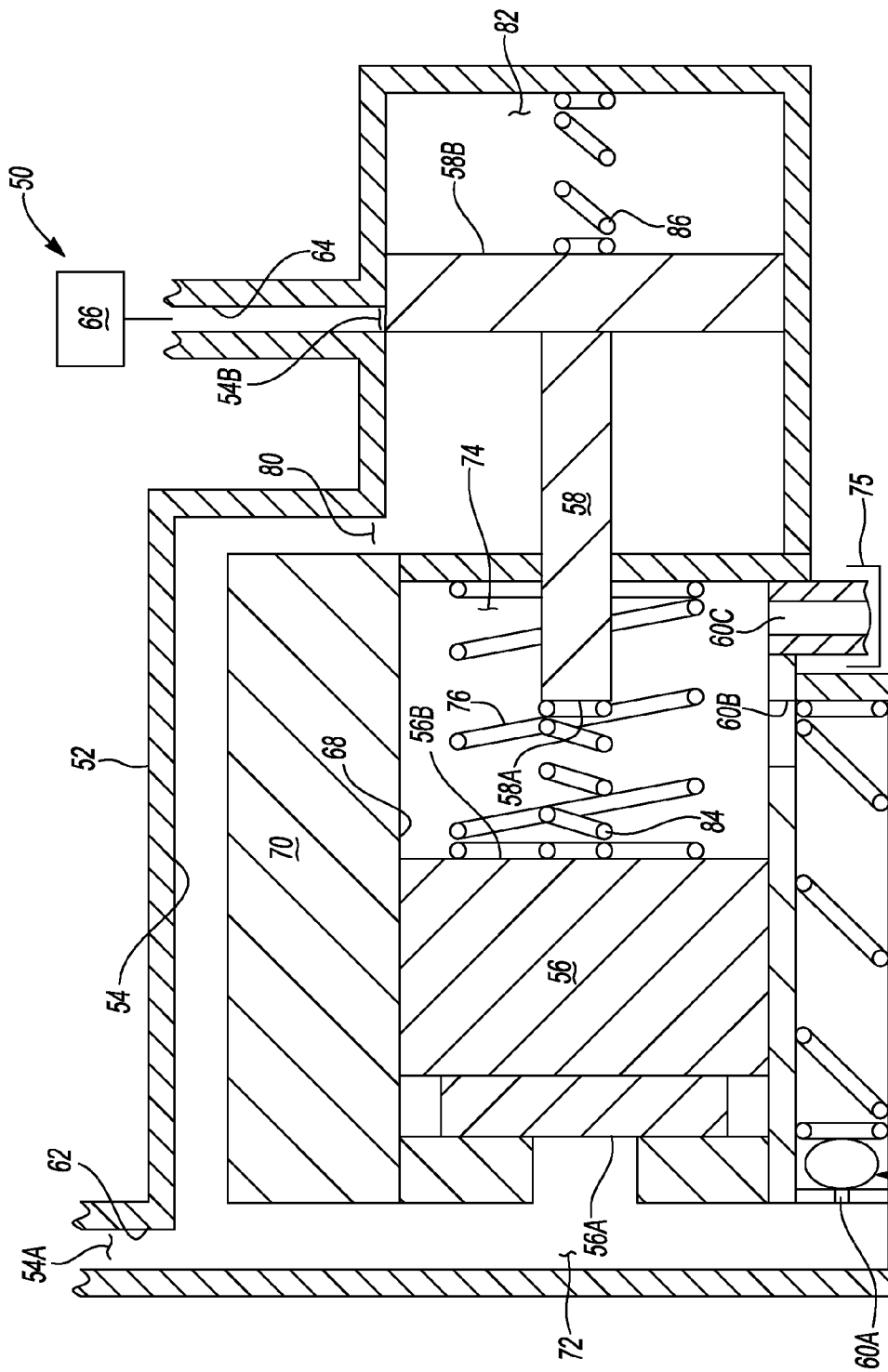
FIG. 5 is a schematic diagram of an exemplary latching clutch valve in a third state according to the principles of the present invention.

When the motor vehicle 5 stops (i.e., at a red light for example), it may be desirable to shut off the engine 12 in order to improve fuel economy. However, shutting off the engine 12 in turn ceases operation of the pump 12 and therefore causes a loss of hydraulic fluid pressure in the transmission hydraulic circuit and clutches. In order to properly control the transmission 14 upon engine re-start and vehicle launch, it is desirable to trap hydraulic fluid within the clutch actuator 66. Therefore, release of pressure allows the latching piston 56 to de-stroke and reseat within the inner bore 68, shown in FIG. 5, while allowing the valve piston 58 to remain de-stroked. This keeps a charge of pressurized hydraulic fluid within the clutch actuator 66 even as the pump 46 is turned off during the engine stop-start event or other operating condition.

Figure 6:
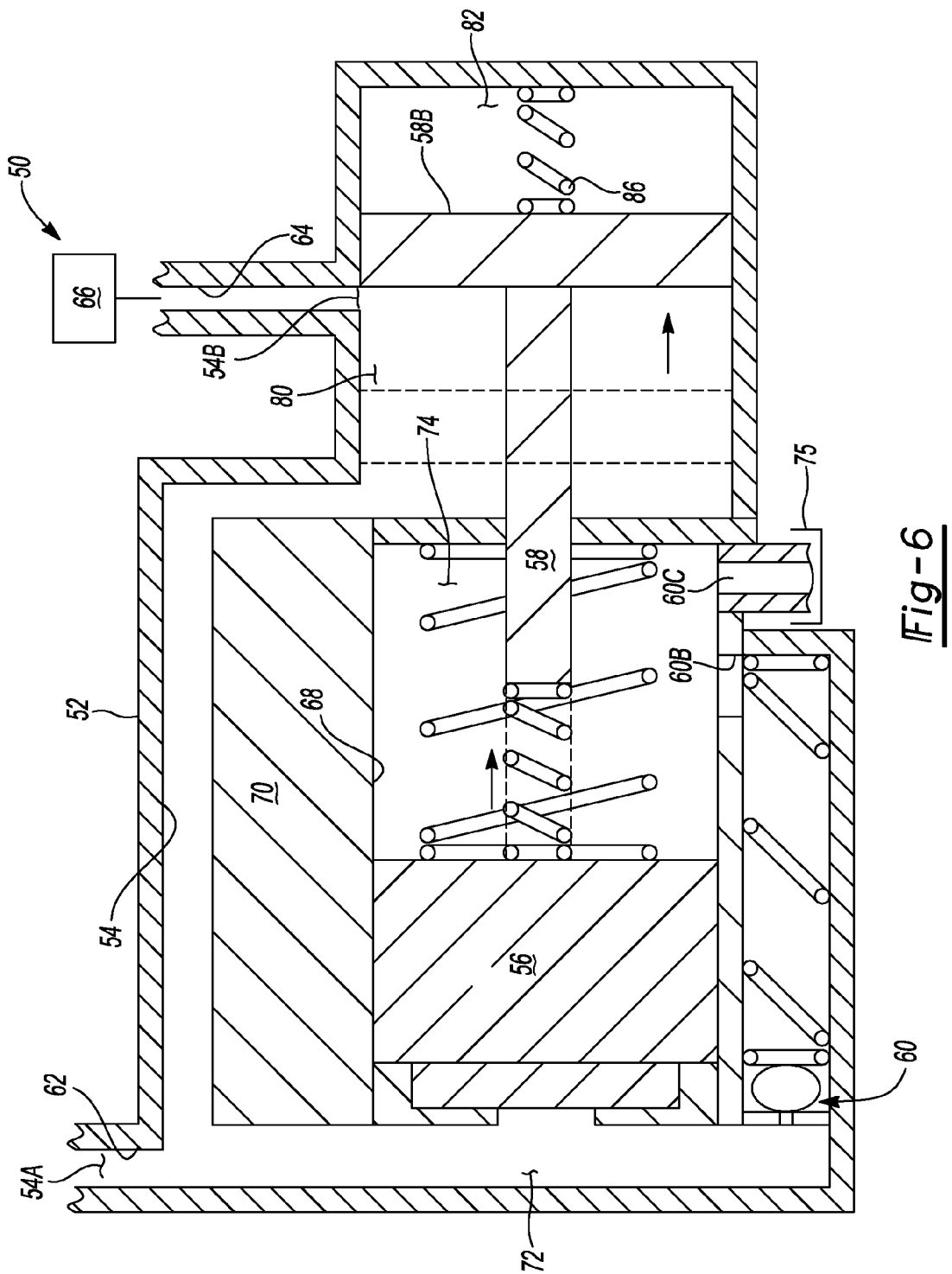
FIG. 6 is a schematic diagram of an exemplary latching clutch valve in a fourth state according to the principles of the present invention

When the engine 12 is restarted and the pump 46 supplies normal pressure levels, the hydraulic fluid acts on the valve piston 58 within the third fluid chamber 80 and forces the valve piston 58 against the holding spring 86. As the valve piston 58 strokes the second port 54B is opened and the latching spring 84 is reset and exerts a biasing force against the valve piston 58, keeping the valve piston 58 stroked until another latching condition occurs, shown in FIG. 6. Due to the charge of pressurized hydraulic fluid within the clutch actuator 66, the associated torque transmitting mechanism 34 may be quickly engaged.

Figure 7:
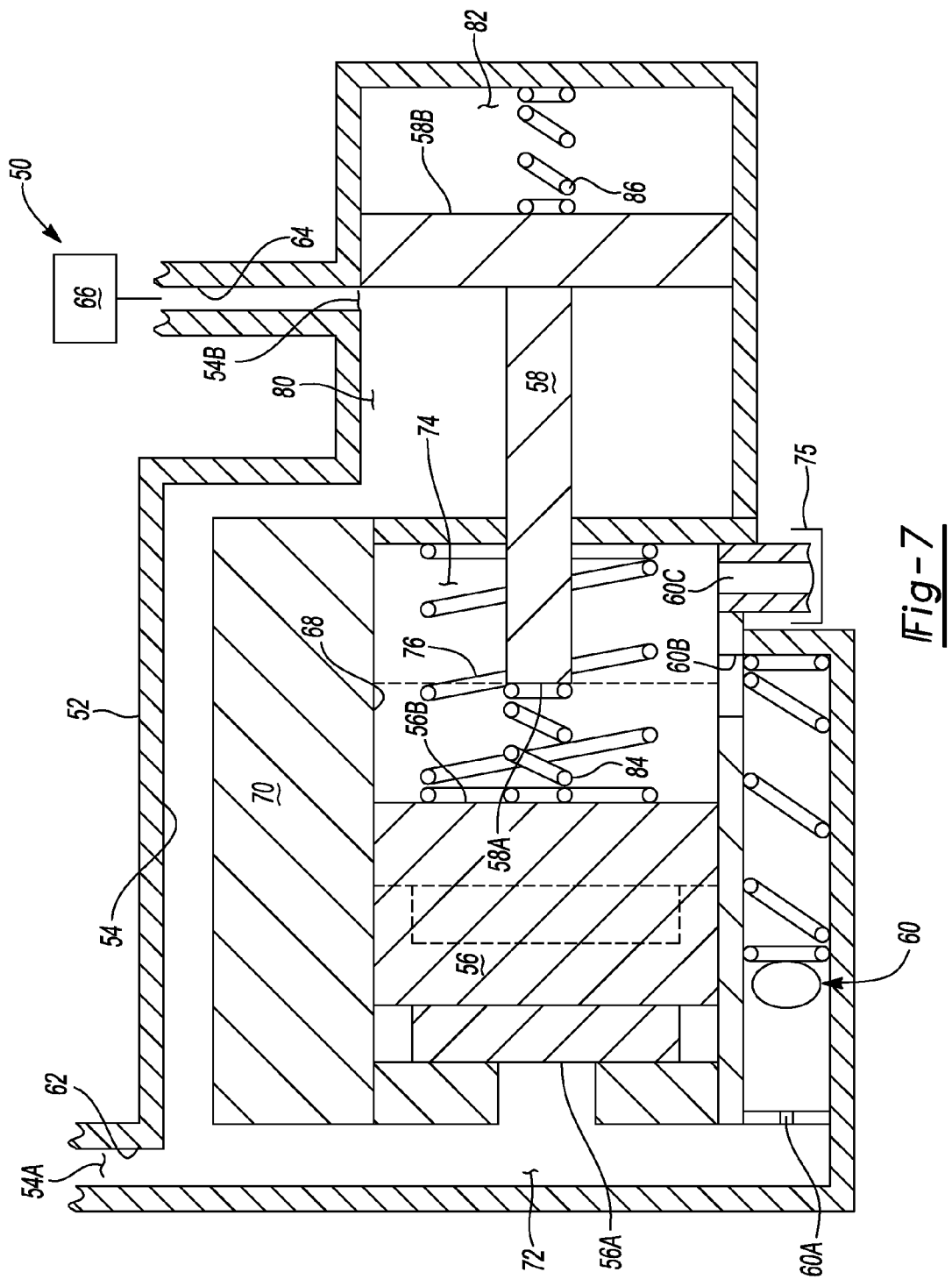
FIG. 7 is a schematic diagram of an exemplary latching clutch valve in a fifth state according to the principles of the present invention.

With reference to FIG. 7, during certain operating conditions it is desirable to unlatch the latching valve 50 without a drop in pressure in the hydraulic control system 38 (i.e. moving from a condition shown in FIG. 4 to one shown in FIG. 7). Accordingly, the one-way valve 60 is configured to unseat or open when the pressure level of the hydraulic fluid communicated from the main supply line 48 to the first fluid chamber 72 exceeds a second threshold value that is greater than the first threshold value described above (i.e. greater than 21 bar). When the one-way valve 60 unseats, shown in FIG. 7, the second fluid chamber 74 communicates and equalizes pressure with the first fluid chamber 72. This allows the balance spring 76 to de-stroke (i.e. move left) the latching piston 56.

Figure 8:
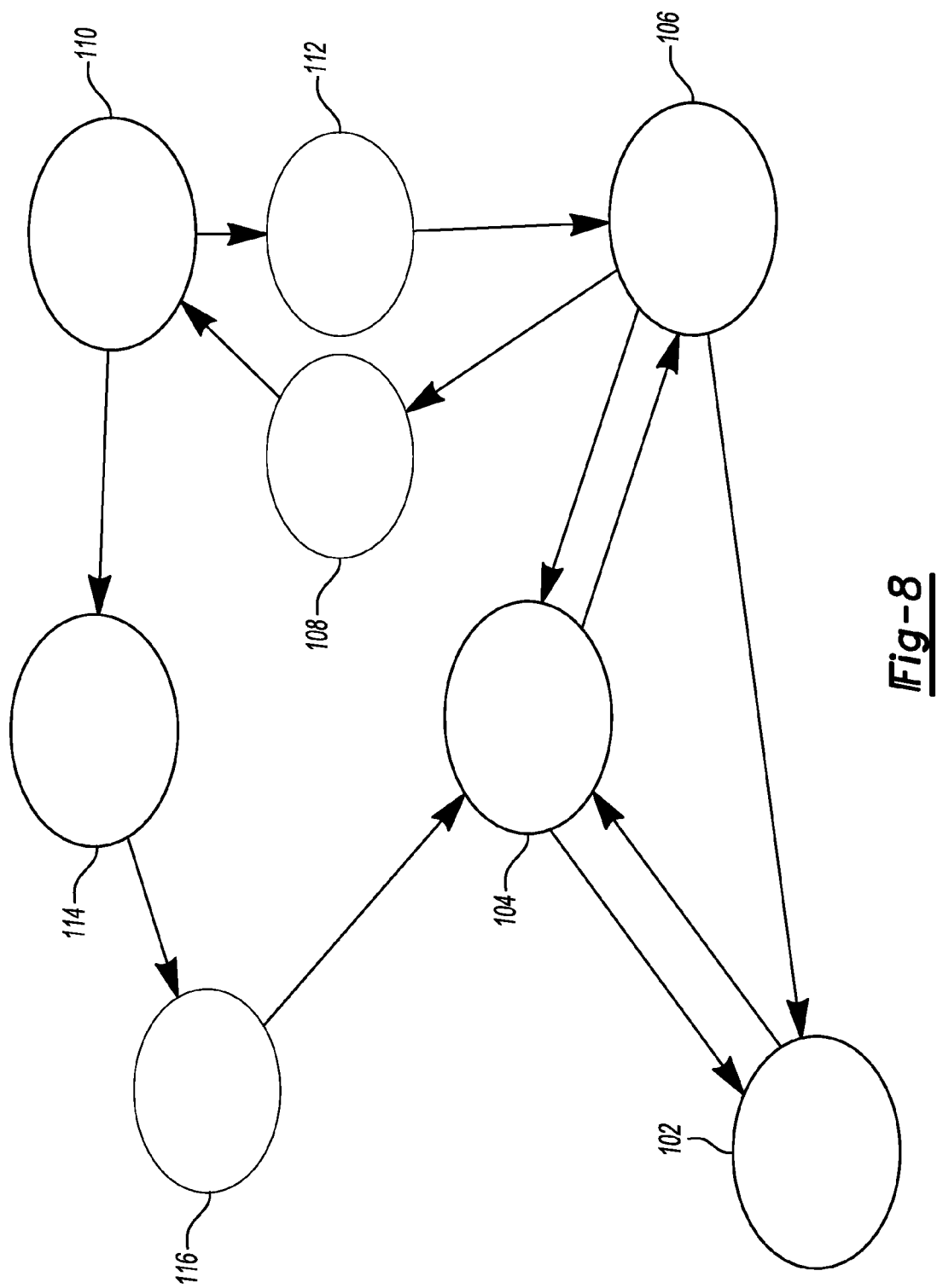
FIG. 8 is a graph illustrating the discrete states of the latching clutch valve described in FIGS. 3-7.

Finally, FIG. 8 is a graph illustrating the different operating conditions of the latch valve 50. In operating mode 102 the feed pressure at port 54A (Pf) is zero and the latch piston 50 is unlatched. In operating mode 104 the transmission is in a normal operating mode and the feed pressure (Pf) at port 54A is less than a pressure (P2) required to latch the valve 50. In operating mode 106 the transmission is in a high pressure operating mode and the valve 50 unlatches when Pf is greater than a pressure (P3) required to unlatch the valve 50. In operating mode 108 the valves latches. In operating mode 110 the valve 50 is latched and Pf is greater than P2 but less than P3. In operating mode 112 the valve 50 unlatches. In operating mode 114 the valve 50 is latched and Pf is less than a pressure (P1) required to unlatch the valve 50 if the valve 50 is initially charged and the pressure is below P1. In operating mode 116 the valve 50 unlatches and Pf is less than P1.

The components of the hydraulic control system 38 and latch valve 50 are connected via a plurality of fluid communication lines. It should be appreciated that the fluid communication lines described above may be integrated in a valve body or formed from separate tubing or piping without departing from the scope of the present disclosure. In addition, the fluid communication lines may have any cross sectional shape and may include additional or fewer bends, turns, and branches than illustrated without departing from the scope of the present disclosure.

The description of the invention is merely exemplary in nature and variations that do not depart from the gist of the invention are intended to be within the scope of the invention. Such variations are not to be regarded as a departure from the spirit and scope of the invention.

The following is claimed:

1. A valve assembly in a transmission, the valve assembly comprising:
    a valve body having an input in selective communication with an output;
    a latching piston disposed within the valve body;
    a balance spring disposed between the latching piston and the valve body;
    a valve piston disposed within the valve body, wherein the input communicates with the output when the valve piston is in a first position and wherein the input does not communicate with the output when the valve piston is in a second position;
    a diaphragm spring disposed between the latching piston and the valve piston; and
    a holding spring disposed between the valve piston and the valve body.

2. The valve assembly of claim 1 wherein the latch piston includes a first side in communication with the input and a second side in selective communication with the input.

3. The valve assembly of claim 2 further comprising a pressure relief valve disposed within the valve body, wherein the pressure relief valve allows selective communication between the input and the second side of the latching piston.

4. The valve assembly of claim 3 further comprising an inner housing disposed within the valve body, and wherein the latching piston is disposed within the inner housing.

5. The valve assembly of claim 4 wherein the inner housing includes a first port in communication with the first side of the latching piston, a second port in communication with the pressure relief valve, and a third port in communication with a sump.

6. The valve assembly of claim 5 wherein the valve piston is sealingly engaged to the valve body and the valve piston includes a stem that is disposed through an opening in the inner housing.

7. The valve assembly of claim 6 wherein the diaphragm spring contacts the second side of the latching piston and the stem of the valve piston.

8. The valve assembly of claim 7 wherein the balance spring contacts the second side of the latching piston and the inner housing.

9. The valve assembly of claim 1 wherein the valve body defines a fluid passage that communicates from the input to the output.

10. The valve assembly of claim 1 wherein the valve piston covers the output when the valve piston is in the second position.

11. A hydraulic control system for a transmission in a motor vehicle, the hydraulic control system comprising:
    a pressure regulator subsystem that provides hydraulic fluid at variable pressures;
    a clutch actuator subsystem;
    a valve assembly including:
        a valve body having an input in selective communication with an output, wherein the input is in communication with the pressure regulator subsystem and the output is in communication with the clutch actuator subsystem;
        a latching piston disposed within the valve body and moveable between a first position and a second position;
        a balance spring disposed between the latching piston and the valve body;
        a valve piston disposed within the valve body, wherein the input communicates with the output when the valve piston is in a first position and wherein the input does not communicate with the output when the valve piston is in a second position;
        a diaphragm spring disposed between the latching piston and the valve piston wherein the diaphragm spring has a normal state that exerts force between the latching piston and the valve piston and an inverted state that does not exert a substantial force on the latching piston and the valve piston; and
        a holding spring disposed between the valve piston and the valve body,
    wherein when a pressure of the hydraulic fluid is less than a first threshold the diaphragm spring is in a normal state and moves the valve piston to the first position against the bias of the holding spring,
    wherein when a pressure of the hydraulic fluid is greater than the first threshold the latching piston moves to the second position and inverts the diaphragm spring;
    wherein when a pressure of the hydraulic fluid is less than the first threshold and the diaphragm spring is inverted the holding spring moves the valve piston to the second position, and
    wherein when a pressure of the hydraulic fluid is greater than a second threshold after the diaphragm spring is inverted and the valve piston is moved to the second position the diaphragm spring is returned to the normal state.

12. The valve assembly of claim 11 wherein the latching piston includes a first side in communication with the input and a second side in selective communication with the input.

13. The valve assembly of claim 12 further comprising a pressure relief valve disposed within the valve body, wherein the pressure relief valve allows selective communication between the input and the second side of the latching piston when a pressure of the hydraulic fluid is greater than a third threshold.

14. The valve assembly of claim 13 wherein the first threshold is greater than the second threshold and the third threshold is greater than the first threshold.

15. The valve assembly of claim 14 wherein the third threshold is associated with a pressure required to provide a reverse gear state.

16. The valve assembly of claim 13 further comprising an inner housing disposed within the valve body, and wherein the latching piston is disposed within the inner housing.

17. The valve assembly of claim 16 wherein the valve piston is sealingly engaged to the valve body and the valve piston includes a stem that is disposed through an opening in the inner housing, and wherein the diaphragm spring contacts the second side of the latching piston and the stem of the valve piston.

18. The valve assembly of claim 17 wherein the valve body defines a fluid passage that communicates from the input to the output.

19. The valve assembly of claim 18 wherein the valve piston covers the output when the valve piston is in the second position to keep hydraulic fluid within the clutch actuator subsystem during and an engine stop/start event.

20. A powertrain in a motor vehicle comprising:
an engine;
a pump driven by the engine for providing hydraulic fluid at variable pressures;
a transmission that receives power from the engine, the transmission having at least one clutch;
a valve assembly including:
a valve body having an input in selective communication with an output, wherein the input is in communication with the pump and the output is in communication with the clutch;
a latching piston disposed within the valve body and moveable between a first position and a second position;
a balance spring disposed between the latching piston and the valve body;
a valve piston disposed within the valve body, wherein the input communicates with the output when the valve piston is in a first position and wherein the input does not communicate with the output when the valve piston is in a second position;
a diaphragm spring disposed between the latching piston and the valve piston wherein the diaphragm spring has a normal state that exerts force between the latching piston and the valve piston and an inverted state that does not exert a substantial force on the latching piston and the valve piston; and
a holding spring disposed between the valve piston and the valve body,
wherein when a pressure of the hydraulic fluid is less than a first threshold the diaphragm spring is in a normal state and biases the valve piston to the first position against the bias of the holding spring and the latching piston is in the first position,
wherein when a pressure of the hydraulic fluid is greater than the first threshold the latching piston moves to the second position and inverts the diaphragm spring;
wherein when a pressure of the hydraulic fluid is less than the first threshold when the engine begins a stop/start event and the diaphragm spring is in the inverted state, the balance spring biases the latching piston to the first position and the holding spring biases the valve piston to the second position, and
wherein when a pressure of the hydraulic fluid is greater than a second threshold after the diaphragm spring is inverted and the valve piston is moved to the second position the diaphragm spring is returned to the normal state.

* * * * *